(12) United States Patent
Jeong et al.

(10) Patent No.: US 6,256,481 B1
(45) Date of Patent: Jul. 3, 2001

(54) MICROPHONE CONNECTING DEVICE FOR FLIP TYPE PORTABLE TELEPHONE

(75) Inventors: Byeong-Ro Jeong; Young-Jin Yi; Sung-Soo Go, all of Seoul; Seong-Ho Ryu, Suwon-shi, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/067,857

(22) Filed: Apr. 27, 1998

Related U.S. Application Data

(63) Continuation-in-part of application No. 08/967,646, filed on Nov. 10, 1997.

(30) Foreign Application Priority Data

Apr. 26, 1997 (KR) .................................................. 97-15756
Apr. 26, 1997 (KR) .................................................. 97-15757

(51) Int. Cl.[7] .............................. H04B 1/38; H04M 1/00
(52) U.S. Cl. .............................. 455/90; 455/90; 455/347; 455/575; 379/433
(58) Field of Search .............................. 455/90, 347, 354, 455/575; 379/433

(56) References Cited

U.S. PATENT DOCUMENTS

| 5,615,259 | * | 3/1997 | Gilbert | 379/433 |
| 5,640,690 | * | 6/1997 | Kudrna | 455/90 |
| 5,692,045 | * | 11/1997 | Takagi et al. | 379/433 |
| 5,697,124 | * | 12/1997 | Jung | 379/433 |
| 5,732,331 | * | 3/1998 | Harms | 455/90 |
| 5,745,567 | * | 4/1998 | Middleton | 379/433 |
| 5,761,300 | * | 6/1998 | Domoleczny | 379/433 |
| 5,915,015 | * | 6/1999 | Thornton | 379/433 |
| 5,960,079 | * | 9/1999 | Prunier et al. | 455/90 |

FOREIGN PATENT DOCUMENTS

| 41 34 650 C1 | 10/1992 | (DE) | H04B/1/38 |

* cited by examiner

*Primary Examiner*—Lee Nguyen
*Assistant Examiner*—Simon Nguyen
(74) *Attorney, Agent, or Firm*—Dilworth & Barrese, LLP

(57) ABSTRACT

A device for electrically connecting a microphone mounted on a flip cover to an audio circuit of a telephone body. The flip cover is detachable from the telephone body when an excessive force is applied thereto. A hinge apparatus includes two hinge modules each including a hinge housing, a hinge shaft having a protrusion at an end and a shaft at another end, being assembled into the hinge housing; conductive means fixedly pressed into a through hole formed along an axis of the hinge shaft; a cam hinge having opposing protrusions and opposing indents formed alternately at one side, engaging with the hinge shaft, and a through hole formed along the axis of the hinge shaft; a hinge cover mounted so as to cover an end of the hinge housing, the hinge cover having a through hole formed along the axis of the hinge shaft, through which an electric wire passes; and a coil spring intervening between the cam hinge and the hinge cover to provide an elastic force. The flip cover includes a first connection terminal having a plane surface, a curved surface and a tension part, wherein the tension part maintains electrical contact with the conductive means, the first connection terminal being installed between a neck and a knuckle; and a microphone mounted on the flip cover, being connected to the first connection terminal via the electric wire, whereby the microphone is electrically connected to an audio circuit of the telephone body.

7 Claims, 16 Drawing Sheets

MICROPHONE CONNECTING DEVICE FOR FLIP TYPE PORTABLE TELEPHONE

RELATED APPLICATION DATA

This application is a continuation-in-part of U.S. application Ser. No. 08/967,646, filed Nov. 10, 1997. The disclosure therein is incorporated by reference in this application.

BACKGROUND OF THE INVENTION

1. Field of the Invention

The present invention relates to a flip type portable telephone, and in particular, to a device for electrically connecting a microphone mounted on a flip cover to an audio circuit in a telephone body.

2. Description of the Related Art

Portable telephones can be widely divided into a bar type and a flip type. The flip type portable telephone has advantages over the bar type portable telephone including superior voice quality. The superior voice quality is afforded by the closer proximity of the microphone on the flip to the user's mouth. The improvement is more pronounced when the size of the telephone is reduced and the microphone in a bar-type phone moves further from the user's voice. A flip cover further acts to protect the phone buttons and prevents unintentional depression of the buttons.

A flip type portable telephone typically includes a telephone body, a flip cover, and a hinge mechanism for mechanically connecting the flip cover to the telephone body. The flip type portable telephone can be placed in a communication standby mode when the flip cover is closed and in a communication mode when it is opened. A microphone of the portable telephone may be disposed at a bottom of the telephone body or at the flip cover.

Miniaturization of the portable telephone is limited due to the need to maintain a distance between the microphone and the earpiece to approximately an average distance between the ear and mouth of the user. That is, in the portable telephone, the distance between a mouthpiece where the microphone is mounted and an earpiece where a speaker is mounted, should be 14 cm or more. As the phone body reduces in length, the flip can be used to extend the length by mounting a microphone on the flip cover.

U.S. Pat. No. 4,897,873, issued to Beutler, et. al., proposes a foldable telephone having a flip element on which a ring element or a microphone is mounted by way of a multipurpose hinge apparatus. The flip cover of the telephone proposed by Beutler, et. al. is fixedly combined with the telephone body so that the flip cover is inseparable from the telephone body. If an excessive force is applied to the flip cover, the flip cover may be broken, rendering the telephone inoperable because the flip-mounted microphone is disconnected from the telephone.

SUMMARY OF THE INVENTION

A flip-type telephone having a flip cover and a telephone body, comprising a hinge apparatus comprising: means for coupling the flip cover to the telephone body and for facilitating opening and closing of the flip cover relative to the telephone body; a hinge housing; a hinge shaft having a protrusion at an end and a shaft at another end, being assembled into said hinge housing; conductive means disposed in a through hole formed along an axis of said hinge shaft; a cam hinge for engaging with the hinge shaft, and a through hole formed along the axis of the hinge shaft; a hinge cover for covering an end of said hinge housing, said hinge cover having a through hole formed along the axis of the hinge shaft, through which an electric wire passes; and a coil spring interposed between the cam hinge and the hinge cover for biasing the cam hinge; wherein the flip cover includes a connection terminal having first and second end portions, the second end portion having tension means for maintaining electrical conductive contact with the conductive means of the hinge apparatus during the opening and closing of the flip cover; and a microphone mounted on the flip cover, being electrically connected to the connection terminal and an audio circuit in the telephone body.

Preferably, the conductive means comprises a cylinder, a conductive bar assembled into the cylinder, being movable in a lengthwise direction, and an elastic body installed in the cylinder, for biasing the conductive bar, wherein an end of said conductive bar is projected out of the hinge shaft.

Further, the conductive bar preferably comprises a small diameter part with an end being projected out of the cylinder, and a large diameter part installed in the cylinder.

A microphone connecting device for a flip type portable telephone according to a second aspect of the present invention includes a telephone body, a flip cover, and a hinge apparatus for coupling the flip cover to the telephone body, comprising a microphone mounted on the flip cover, first connection terminals attached to respective knuckles of the flip cover, the terminals being electrically connected to the microphone, and second connection terminals disposed at both sides of the telephone body, being connected to an audio circuit in the telephone body, wherein sliding surfaces of the first connection terminals contact with respective contact surfaces of the second connection terminals when the flip cover is opened from the telephone body, wherein the sliding surfaces are disconnected from the contact surfaces when the flip cover is closed to the telephone body, whereby the microphone is electrically connected to the audio circuit through the first connection terminals when the flip cover is opened.

Preferably, each of the first connection terminals comprises a planar surface, a curved surface, a sliding surface, and a hook surface. The knuckle preferably has an opening formed about its circumference, into which the sliding surface of the first connection terminal is inserted for fixing the first connection terminal to the knuckle.

A flip-type telephone according to another aspect of the present invention includes a flip cover coupled to a telephone body, comprising a microphone in a the flip cover, an audio circuit in the telephone body, first mating means in the flip cover for mating with a second mating means in the telephone body wherein the first and second mating means each includes electrically conductive members for forming an electrical connection between said microphone and said audio circuit at least when said flip cover is opened relative to said telephone body, wherein at least one of said electrically conductive members includes elastic characteristics.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF PREFERRED EMBODIMENTS

Figure 1:
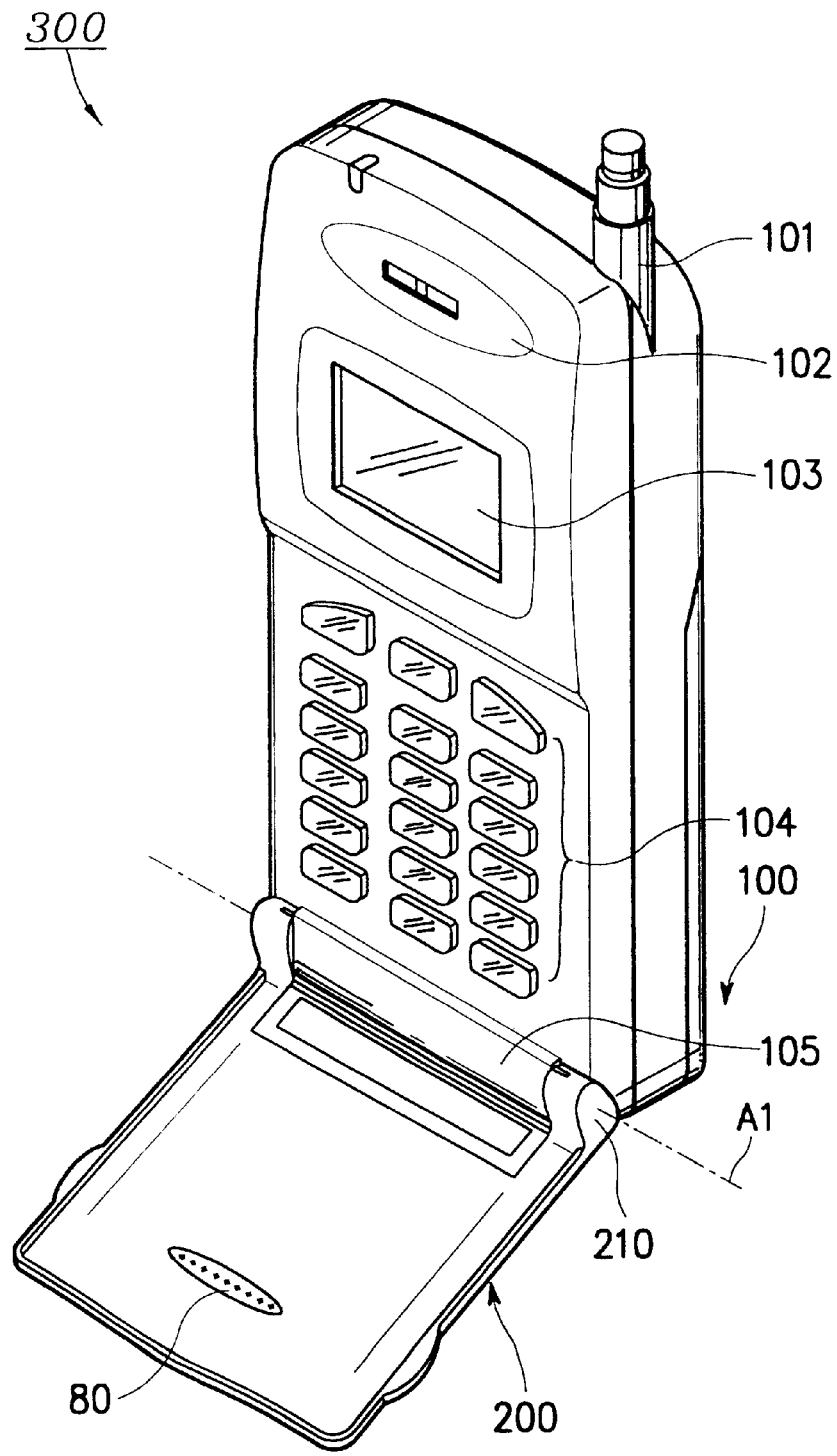
FIG. 1 is a perspective view illustrating a flip type portable telephone according to a first embodiment of the present invention.

Preferred embodiments of the present invention will be described in detail with reference to the attached drawings. Like reference numerals denote the same components in the drawings, and description of known devices, techniques, and characteristics will be omitted if it is deemed to obscure the subject matter of the present invention.

FIG. 1 is a perspective view of a flip type portable telephone according to an embodiment of the present invention. Referring to FIG. 1, a portable telephone 300 has a flip cover 200. When the flip cover 200 is opened, the portable telephone 300 is in an off-hook state where the user can talk over the telephone. If the flip cover 200 is closed, the portable telephone 300 is in an on-hook state.

As illustrated, the flip type portable telephone 300 according to the present invention includes a telephone body 100, the flip cover 200 detachably coupled onto the telephone body 100, and a hinge apparatus (not shown) installed within a receiving part 105 for maintaining an opening angle of the flip cover 200. In such manner, the hinge apparatus mechanically couples the flip cover 200 to the telephone body 100. The hinge also electrically connects a microphone 80 mounted on the flip cover 200 to a printed circuit board (PCB) in the telephone body 100.

The portable telephone 300 includes an antenna unit 101 installed in an upper portion thereof, an earpiece 102 having a speaker, a display such as an LCD (Liquid Crystal Display) unit 103 disposed at the lower portion of the earpiece 102, and a keypad 104 having a plurality of buttons or keys, which may be function keys and dial keys, disposed at the lower portion of the LCD unit 103. The microphone 80 is mounted on the flip cover 200, preferably on the outer portion thereof.

The flip cover 200 may have a label or sheet cover attached onto the case by laser melting. In consideration of the average distance (e.g., 14 cm) between the mouth and ear of the human being, the microphone 80 is preferably mounted at the outer portion of the flip cover 200. In this illustrative embodiment, the microphone 80 is electrically connected to an audio circuit in the telephone body 100 by means of a contact structure in the receiving part 105. The contact structure for electrically connecting the microphone 80 to the audio circuit of the telephone body 100 will be describe in detail hereinbelow.

Figure 2:
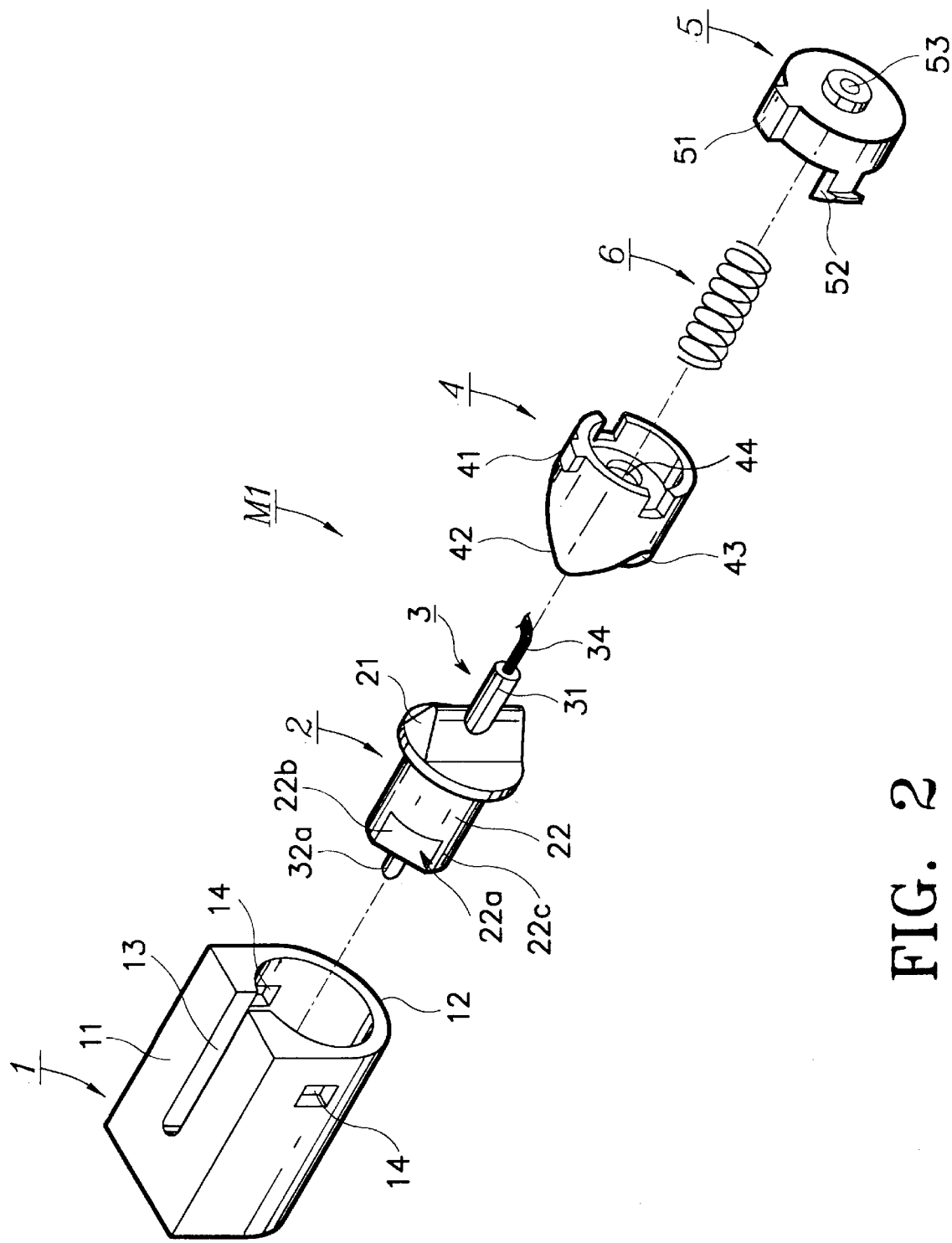
FIG. 2 is an exploded view illustrating elements of a hinge module according to the first embodiment of the present invention.
Figure 3:
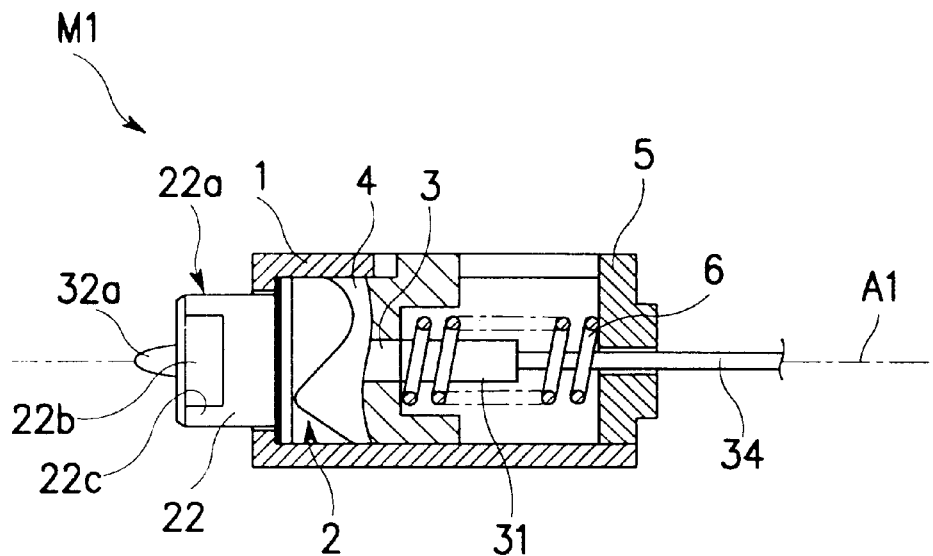
FIG. 3 is a cross-sectional view illustrating a state where the hinge module is assembled according to the first embodiment of the present invention.

FIG. 2 is an exploded view illustrating elements of a microphone connecting device serving as a hinge apparatus for the flip type portable telephone according to the first embodiment of the present invention. FIG. 3 is a cross-sectional view of a hinge module of FIG. 2.

Figure 8:
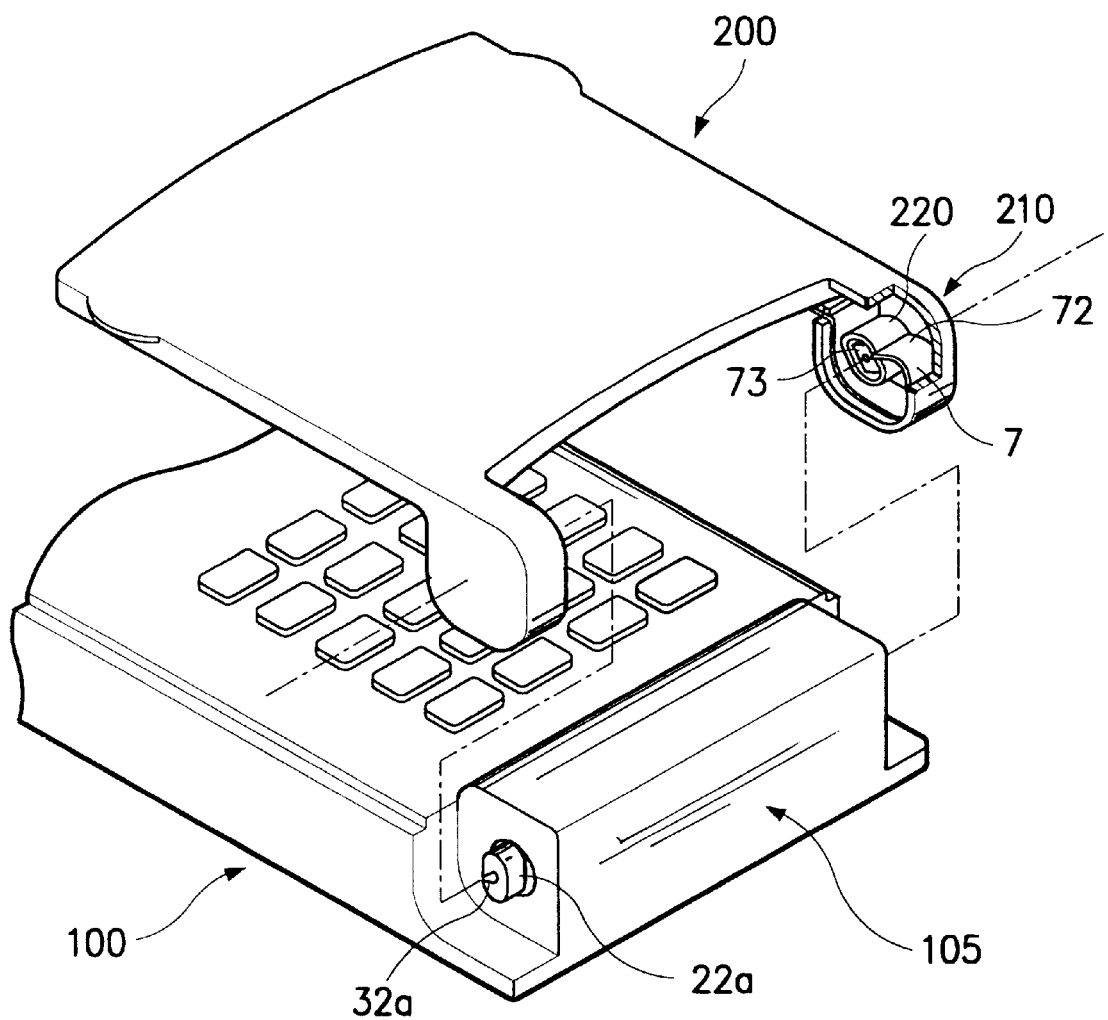
FIG. 8 is a partial perspective view illustrating how to assemble the flip cover into the telephone body according to the first embodiment of the present invention.
Figure 9:
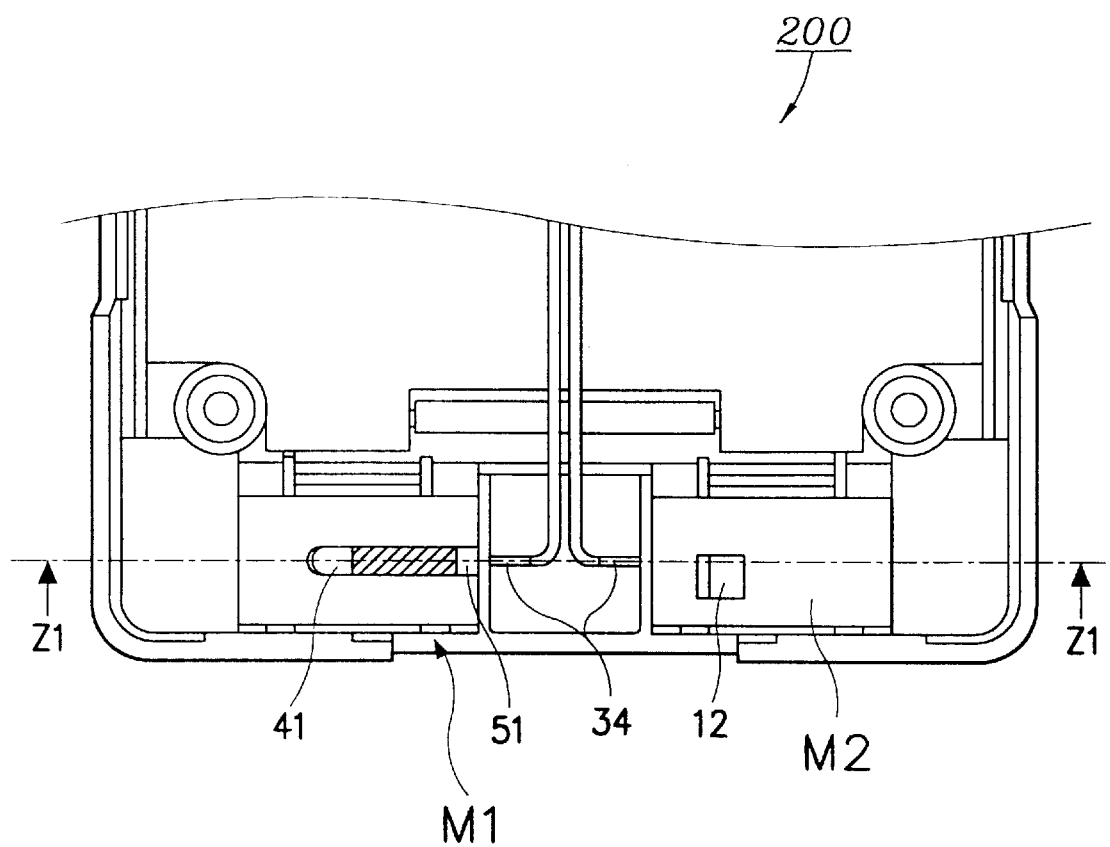
FIG. 9 is a plan view illustrating a state where the hinge module is assembled into the telephone body according to the first embodiment of the present invention.

First, as illustrated in FIGS. 8 and 9, the hinge apparatus according to the present invention includes two hinge modules M1 and M2 installed in the receiving part 105 at the bottom of the telephone body 100. The hinge modules M1 and M2 have the same construction as shown in FIG. 2.

Referring to FIG. 2, the hinge module M1 includes a hinge housing 1, a hinge shaft 2 inserted into the hinge housing 1 along an axis A1, a spring connector pin 3 fixedly inserted into a through hole formed along the central axis A1 of the hinge shaft 2, a cam hinge 4 engaged with the hinge shaft 2, a hinge cover 5 for covering an end of the hinge housing 1, and a coil spring interposed between the cam hinge 4 and the hinge cover 5.

The hinge housing 1 has a planar upper surface 11 and a rounded lower surface 12, for ease of manufacture. An elongated guide slit 13 is formed in the upper surface 11 in a lengthwise direction (i.e., in the direction of the axis Al), and hooking grooves 14 are formed at both sides of the hinge housing 1. The hinge shaft 2 is insertable into the hinge housing 1 and has a protrusion 21 and a shaft 22 respectively at end portions thereof. An end portion 22a of the shaft 22 has a pair of opposite planar surfaces 22b and a pair of opposite rounded surfaces 22c, being formed alternately. That is, the end 22a of the shaft 22 preferably has two opposite plane surfaces 22b and two opposite rounded surfaces 22c. The end 22a of the shaft 22 has a shape corresponding to that of a hooking part of the flip cover 200.

In case the flip cover 200 is assembled into the end portion 22a of the shaft 22, the hinge shaft 2 rotates together with the flip cover 200 when opening and closing the flip cover 200. A through hole is formed along the axis of the hinge shaft 2, and the spring connector pin 3 is pressed into the through hole in such a manner that one and the other ends of the spring connector pin 3 are protruded out of the hinge shaft 2. That is, a small diameter part 32a of the spring connector pin 3 is protruded out at one end of the hinge shaft 2, and a cylinder 31 of the spring connector pin 3 is projected out at the other end of the hinge shaft 2. An electric wire 34 is drawn out from the end of the cylinder 31, and is preferably connected to the audio circuit in the telephone body 100. The construction of the spring connector pin 3 is further shown in FIG. 4.

Referring to FIGS. 2, and 3, the cam hinge 4 engaged with the hinge shaft 2 is inserted into the hinge housing 1 and has a guide protrusion 41 formed upward to be guided along the elongated guide slit 13, so that the cam hinge 4 can freely move forward and backward. Protrusions 42 and indents 43 are alternately formed at one end of the cam hinge 4. That is, the cam hinge 4 has a pair of the opposing protrusions 42 and a pair of the opposing indents 43 formed at one end thereof.

A through hole 44 is formed in the cam hinge 4 along the central axis A1 of the hinge shaft 2. That is, the through hole 44 is on the same axis as the spring connector pin 3. Here, the through hole 44 should have a diameter slightly larger than that of the spring connector pin 31, so that the hinge shaft 2 can rotate together with the flip cover 200, without hindrance of the cam hinge 4.

In addition, a hinge cover 5 is installed at the outermost end of the hinge housing 1, with the coil spring 6 intervening between the cam hinge 4 and the hinge cover 5. One end of the coil spring 6 is supported by the cam hinge 4 and the other end thereof is supported by the hinge cover 5. In this way, the coil spring 6 provides an elastic force to the cam hinge 4. The hinge cover 5 has a protrusion 51 to be guided along the elongated guide slit 13 and opposite hooks 52 to be inserted into the hooking grooves 14. A through hole 53 having a diameter larger than that of the electric wire 34 is formed along the same axis of the through hole 44, so that the hinge shaft 2 can rotate together with the flip cover 200, the spring connector pin 3, and the electric wire 34, without hindrance of the through hole 53.

Figure 4:
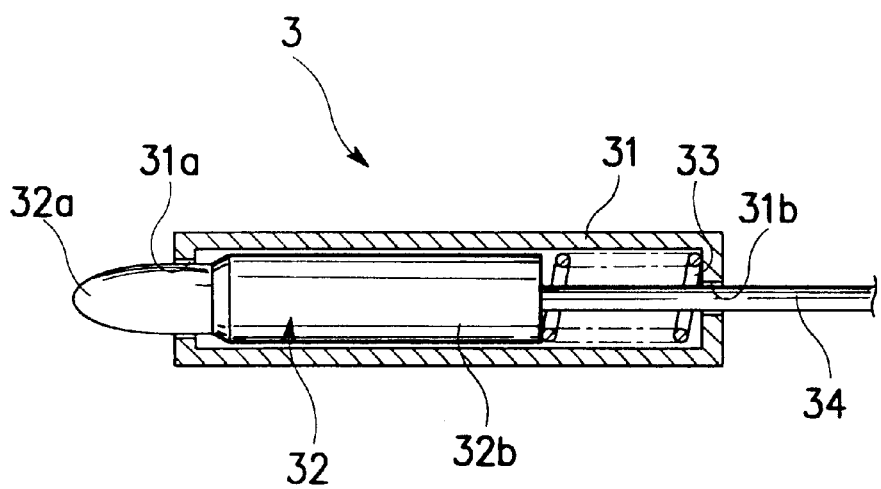
FIG. 4 is a cross-sectional view of a spring connector pin according to the first embodiment of the present invention.

FIG. 4 is a cross-sectional view illustrating the structure of the spring connector pin 3 according to the first embodiment of the present invention. Referring to FIG. 4, the spring connector pin 3 frictionally inserted into the hinge shaft 2 includes a cylinder 31, a conductive bar 32 which is disposed in the cylinder 31 to be movable in the lengthwise direction of the cylinder 31, and a coil spring 33 installed in the cylinder 31, for elastically supporting the conductive bar 32. The conductive bar 32 has a small diameter part 32a and a large diameter part 32b. The small diameter part 32a is rounded at an end thereof, and the large diameter part 32b has an end to which the electric wire 34 is connected. The cylinder 31 has a through hole 31a, formed at an end thereof, having a diameter slightly larger than that of the small diameter part 32a such that the small diameter part 32a can be projected out of the cylinder 31, and a through hole 31b, formed at the other end thereof, having a diameter larger than that of the electric wire 34. The conductive bar 32 is biased toward the left side by the elastic force of the coil spring 33.

Figure 5:
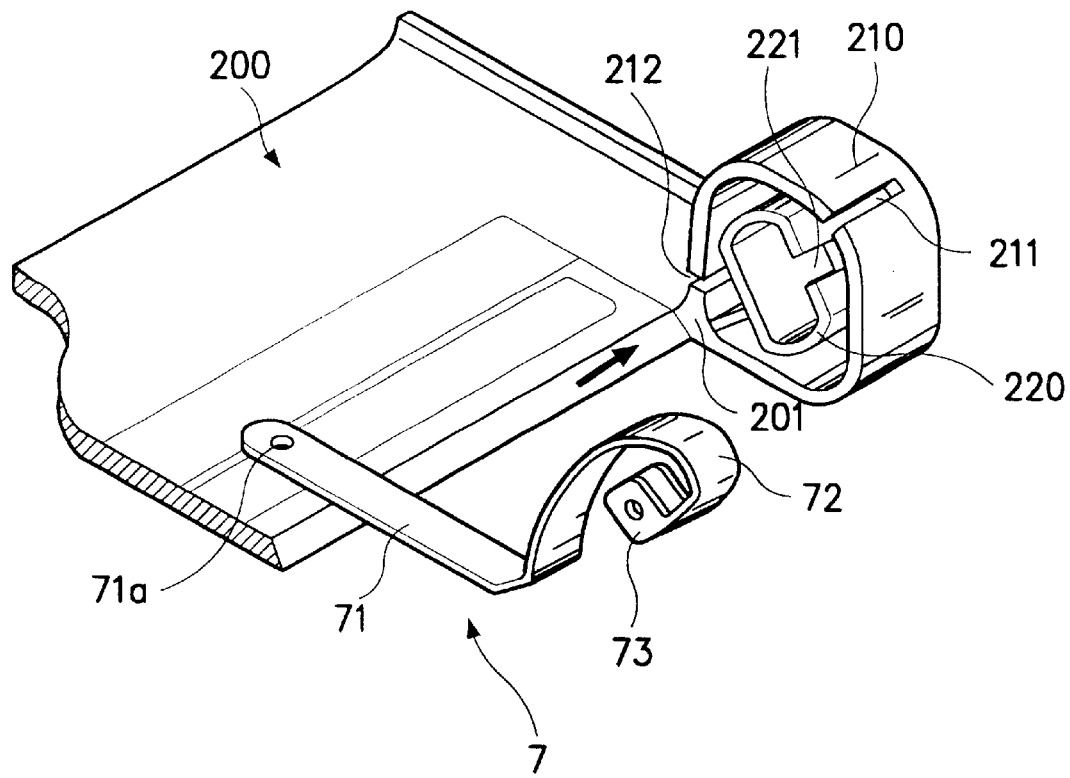
FIG. 5 is a perspective view illustrating how to assemble a connection terminal into a neck part of the flip cover according to the first embodiment of the present invention.
Figure 6:
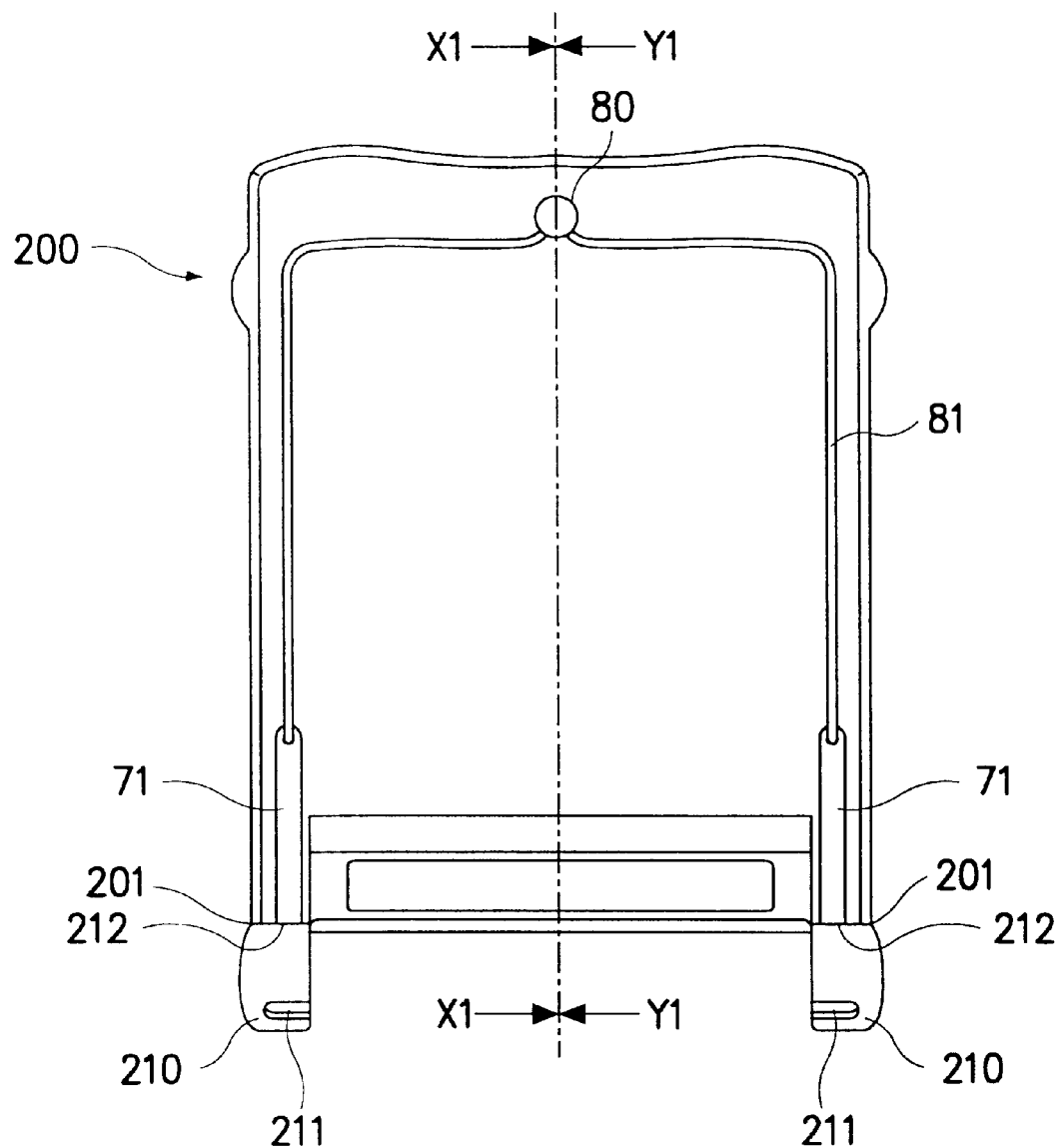
FIG. 6 is a plan view illustrating a state where a microphone is mounted on the flip cover according to the first embodiment of the present invention.
Figure 7A:
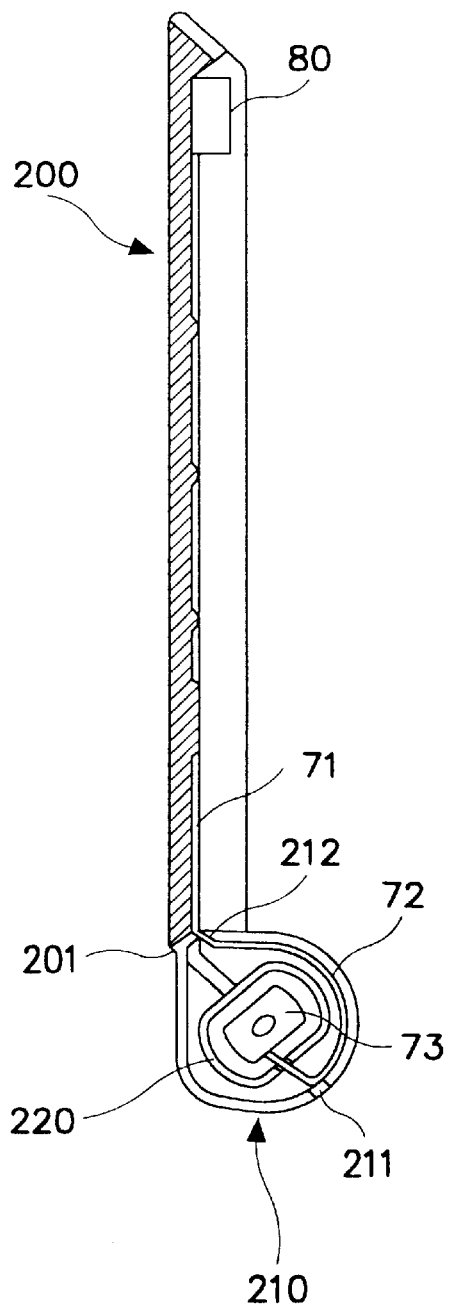
FIGS. 7A and 7B are cross-sectional views of the flip cover, taken along line X1—X1 and Y1—Y1 of FIG. 6, respectively.

FIG. 5 is a perspective view illustrating the assembly of a first connection terminal 7 into a knuckle 210 of the flip cover 200 according to the first embodiment of the present invention. FIG. 6 is a plan view illustrating a state where the first connection terminal 7 is installed in the flip cover 200 according to the first embodiment of the present invention. FIG. 7A is a cross-sectional view taken along line X1—X1 of FIG. 6, and FIG. 7B is a cross-sectional view taken along line Y1—Y1 of FIG. 6.

Referring to FIG. 5, the flip cover 200 has a knuckle 210 formed at an end of a neck part 201. A hooking part 220 is formed in the knuckle 210, and a disassembly groove 211 is formed at the circumference of the knuckle 210. A groove 212 through which a first connection terminal 7 passes is formed at the neck part 201. The first connection terminal 7 is disposed between an electric wire drawn from the microphone 80 and the spring connector pin 3 pressed into the hinge shaft 2, electrically connecting therebetween. The first connection terminal 7 is assembled into a coupling part of the knuckle 210 in the arrow direction. An end of the first connection terminal 7 assembled into the knuckle 210 is connected to an electric wire drawn from the microphone 80 and the other end thereof contacts the small diameter part 32a of the spring connector pin 3. The first connection terminal 7 includes a planar surface 71 formed at a first portion, a curved surface 72 formed at around the middle, and a tension part 73 formed at a second portion. The first connection terminal 7 is made by bending a plate spring. The planar surface 71 has a hole 71a formed at the first portion thereof, to which the electric wire can be fixed, and is fixed to a planar surface of the flip cover 200. The curved surface 72 includes elastic characteristics. The curved surface 72 is preferably inserted between the hooking part 220 and the knuckle 210 and is held in place by the biased elastic force. Further, the tension part 73 is formed with two sides bent to face each other, and one of the both sides has a through hole into which the end of the small diameter part 32a can be inserted. The tension part 73 is installed in the hooking part 220.

Figure 7B:
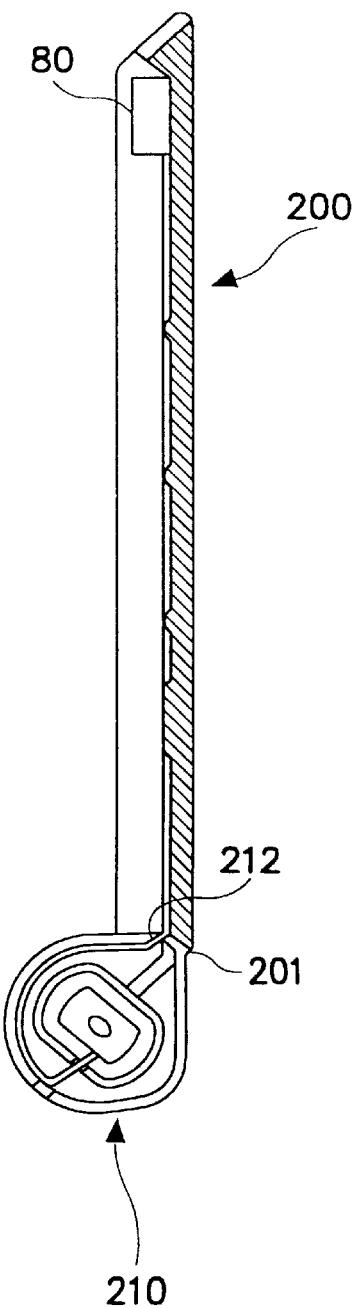

Referring to FIGS. 6, 7A, and 7B, the microphone 80 is preferably installed at an outer portion of the flip cover 200 to reach the average distance between the mouth and ear of a human being. The microphone 80 is electrically connected to the planar surface 71 of the first connection terminal 7 via the electric wire 81 drawn therefrom. The electric wire 81 may be secured to the flip cover 200 in known methods, including using an adhesive tape or embedding it in the flip cover 200.

Figure 10:
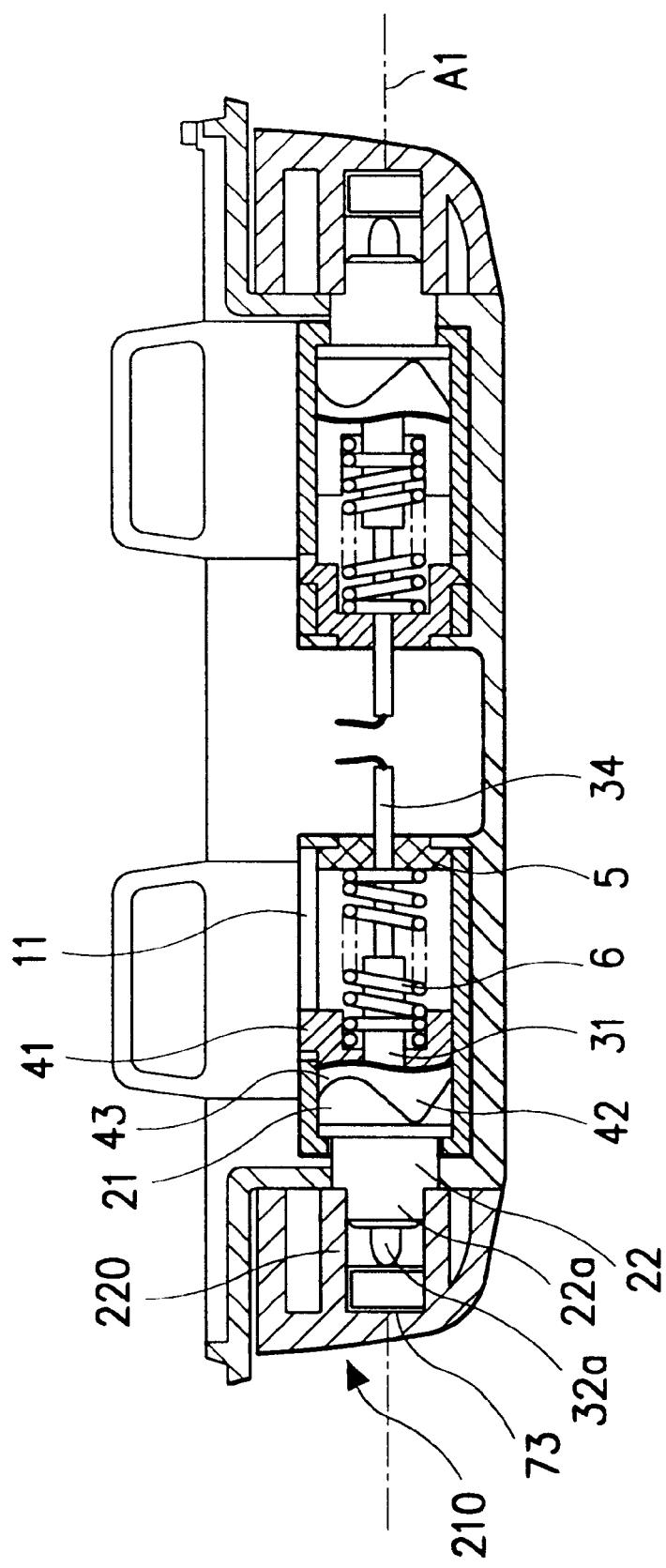
FIG. 10 is a cross-sectional view of the portable telephone, taken along line Z1—Z1 of FIG. 9.

FIG. 8 is a perspective view illustrating the assembly of the flip cover 200 into the telephone body 100 according to the first embodiment of the present invention. FIG. 9 is a plane view illustrating a state where the hinge module M1 is assembled into the telephone body 100 according to the first embodiment of the present invention. FIG. 10 is a cross-sectional view taken along line Z1—Z1 of FIG. 9.

Referring to FIG. 8, when the hinge modules M1 and M2 are installed in the receiving part 105, the end 22a of the hinge shaft 2 and the small diameter part 32a of the spring connector pin 3 are respectively projected out of the receiving part 105 formed at the bottom of the telephone body 100. Further, the first connection terminal 7 is visibly disposed at the knuckle 210 of the flip cover 200. The flip cover 200 is readily detachable from the telephone body 100, particularly when an excessive force is applied thereto. Accordingly, even in case the flip cover 200 is forcedly detached from the telephone body 100, the excessive force is not transferred to the neck part 201 so that the flip cover 200 cannot be damaged. To assemble the flip cover 200 into the telephone body 100, the user forcedly presses the small diameter part 32a and inserts the small diameter part 32a into the hooking part 220.

The mechanism involved in the opening/closing operations of the flip cover 200 can be more readily understood with reference to FIGS. 9 and 10. When the user opens the flip cover 200 to make a phone call, the end 22a of the hinge shaft 2 rotates together with the flip cover 200 by the rotation angle of the flip cover 200. As the hinge shaft 2 rotates, the cam hinge 4 moves backward by the sliding contact with the protrusion 21 of the hinge shaft 2, and then smoothly moves forward when the protrusion 21 reaches the peak of the protrusion 42. Rotation of the flip cover 200 stops at a position where the protrusion 21 of the hinge shaft 2 is engaged again with the indent 43 of the cam hinge 4, maintaining the opening angle for the communication.

One tension part 73 of the first connection terminal 7 maintains a surface contact with the small diameter part 32a of the spring connector pin 3. The small diameter part 32a with the end having the curved surface has a good contact feature. Further, since the tension part 73 has elastic characteristics and the small diameter part 32a is also elastically biased by the two coil springs 6 and 33, an electrical contact is maintained. With rotation of the flip cover 200, the hinge shaft 2 rotates together with the spring connector pin 3 to maintain contact between the small diameter part 32a and the tension part 73.

Accordingly, an electric connection between the microphone 80 and the telephone body 100 is made by connecting a wire 81 from microphone 80 to the planar surface 71 of the first connection terminal 7, which is in turn electrically connected to the conductive bar 32 via the tension part 73 of the connection terminal 7 and the small diameter part 32a of the conductive bar 32. The conductive bar 32 is connected to an audio circuit of the telephone body 100 via the electric wire 34. Further, the flip cover 200 is detachable from the telephone body 100. If the flip cover 200 is detached from the telephone body 100, such as by an external impact, the user can simply reinstall the flip cover 200 into the telephone body 100.

A plastic sheet or a sliding cover may be used for covering the microphone 80 and the planar surface 71 of the first connection terminal 7, which can be exposed at the inner surface of the flip cover 200.

Figure 11:
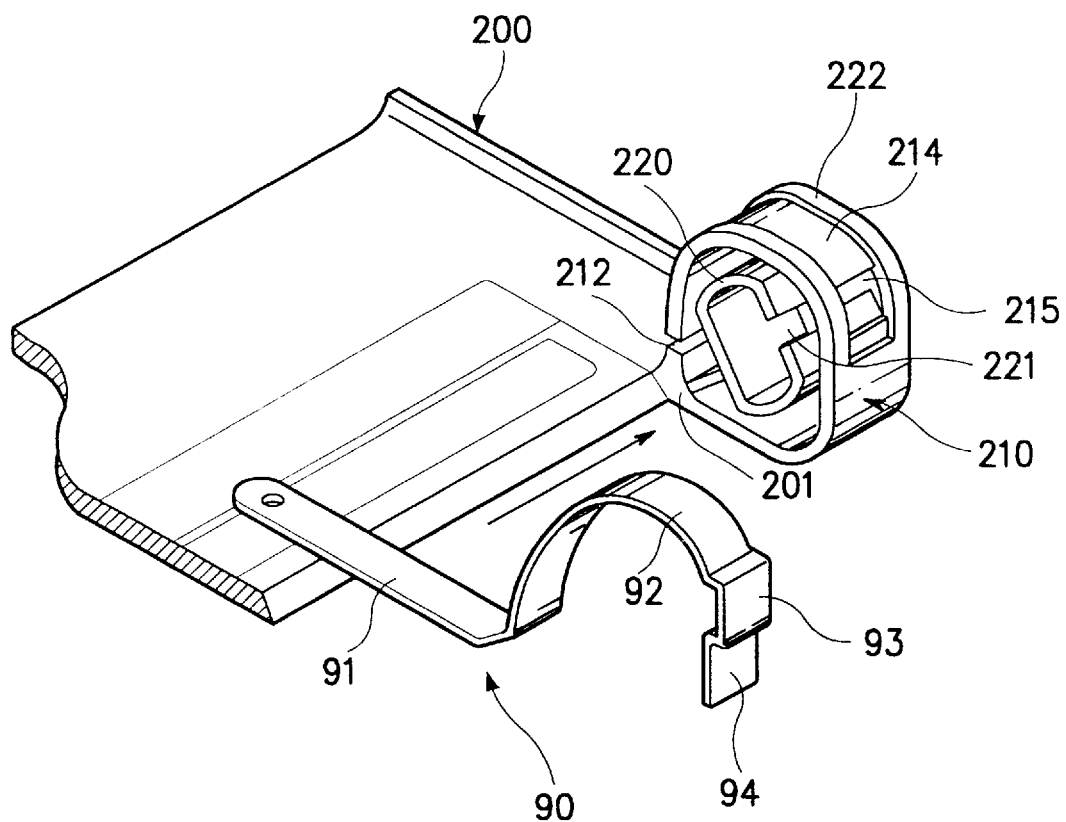
FIG. 11 is a partial perspective view illustrating how to assemble a connection terminal into the flip cover according to a second embodiment of the present invention.
Figure 12:
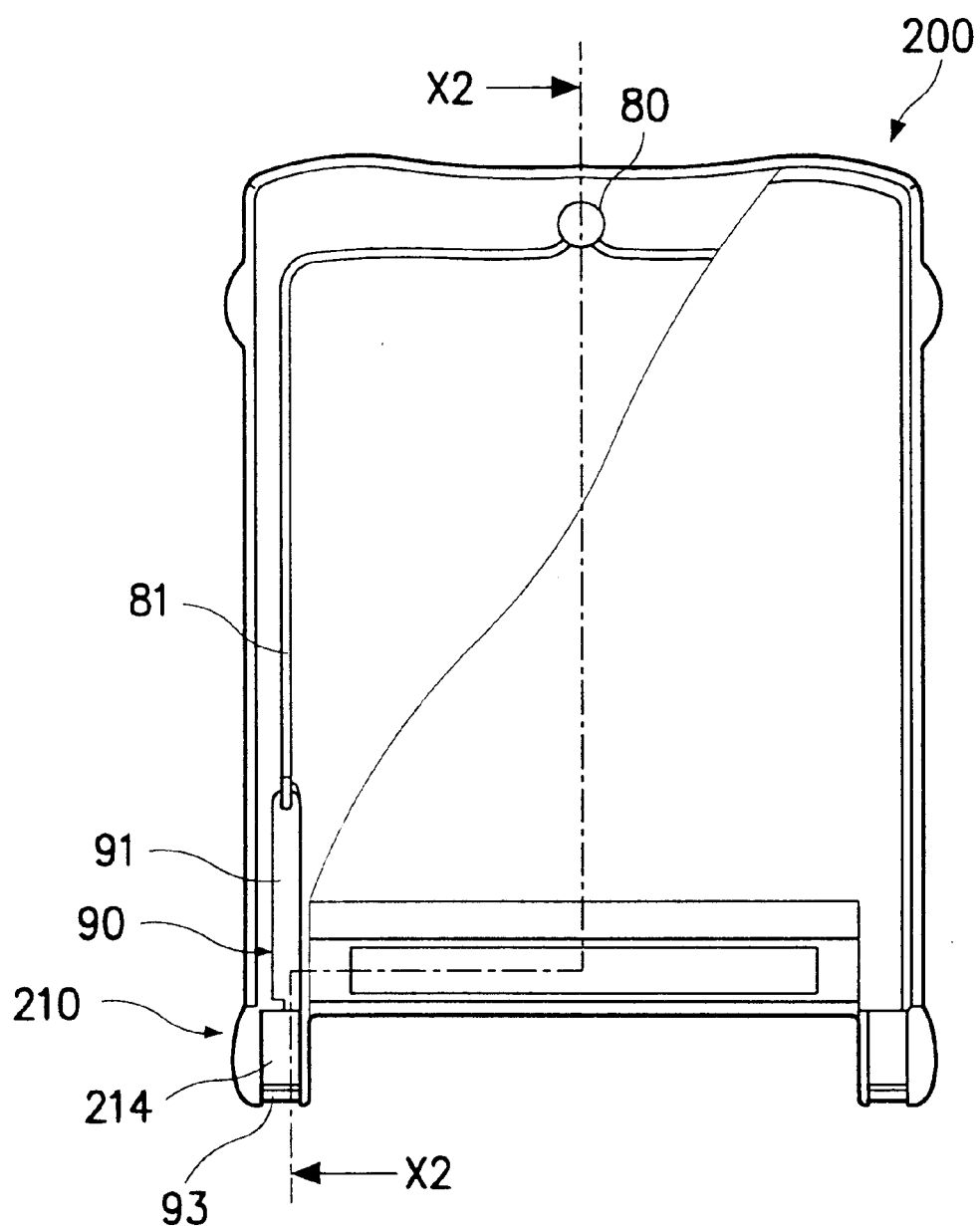
FIG. 12 is a plan view illustrating a state where the connection terminal and the microphone are mounted on the flip cover according to the second embodiment of the present invention.
Figure 13:
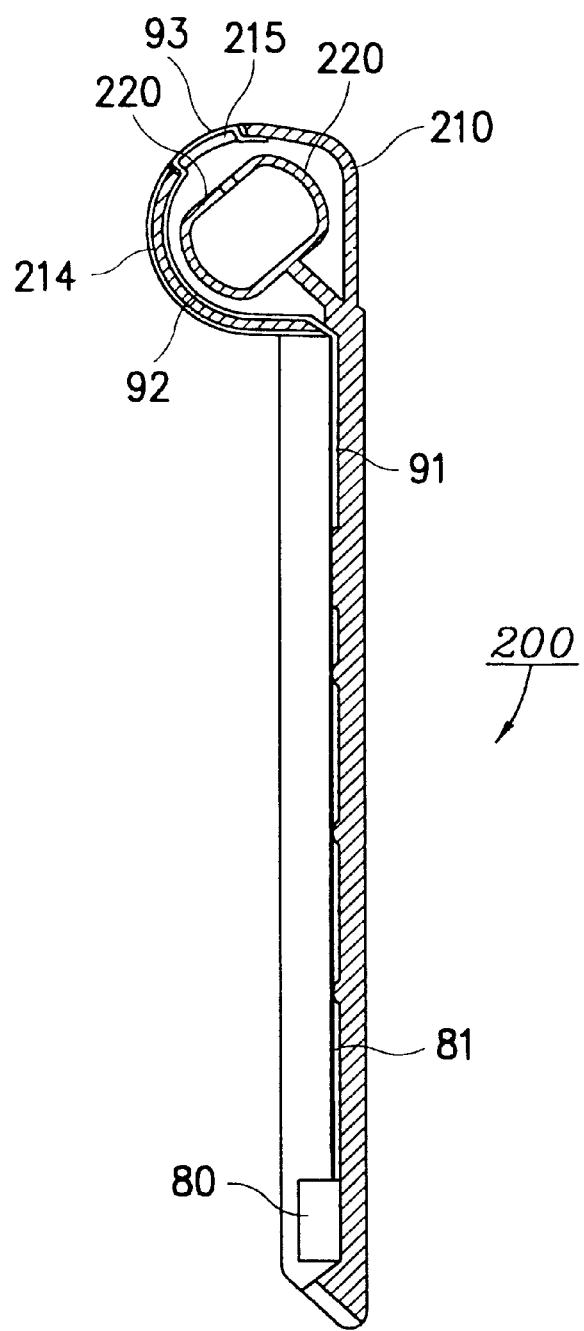
FIG. 13 is a cross-sectional view of the flip cover, taken along line X2—X2 of FIG. 12.

FIG. 11 is a perspective view illustrating a second embodiment according to the present invention, wherein a second connection terminal 90 is fitted into the knuckle 210 of the flip cover 200. FIG. 12 is a plan view illustrating a state where the second connection terminal 90 is installed in the flip cover 200 according to the second embodiment of the present invention. FIG. 13 is a cross-sectional view taken along line X2—X2 of FIG. 12.

As illustrated in FIGS. 11 to 13, the microphone connecting device attached to the flip cover 200 according to the second embodiment of the present invention has the second connection terminal 90 installed in the flip cover 200 and a third connection terminal 95 installed in the telephone body 100. When the flip cover 200 is opened, the two connection terminals 90 and 95 contact each other. Similarly, the microphone 80 is installed in the flip cover 200. The electric wire 81 of the microphone 80 is electrically connected to the second connection terminal 90. Meantime, the third connection terminal 95 (see FIGS. 14 and 15) connected to the printed circuit board (not shown) is installed in the telephone body 100, at a position corresponding to the second connection terminal 90. Here, the second and third connection terminals 90 and 95 make contact with each other, when the flip cover is opened.

As illustrated in FIGS. 11 to 13, the flip cover 200 has the neck part 201 extending therefrom and the knuckle 210 in turn extending from the neck part 201. The flip cover 200 is detachable from the telephone body 100. Further, the knuckle 210 has the hooking part 220 formed therein. The second connection terminal 90 is disposed between knuckle 210 and the hooking part 220 in the arrow direction. A guide groove 214 is formed at a specific position on the circumference of the knuckle 210, and has an opening 215 through which a part of the second connection terminal 90 is to be projected. The hooking part 220 has the disassembly groove 221, and the groove 212, formed in the vicinity of the neck part 201, into which the second connection terminal 90 is to be inserted.

The second connection terminal 90 according to the second embodiment of the present invention has a planar surface 91, a curved surface 92, and a sliding surface 93. The planar surface 91 is electrically connected to the microphone 80 via the electric wire 81, the curved surface 92 is tightly inserted between the knuckle 210 and the hooking part 220, and the sliding surface 93 is inserted into the opening 215 formed at the circumference of the knuckle 210, protruding therethrough. An end portion 94 of the second connection terminal 90 is formed such that the sliding surface 93 is trapped into the opening 215. The second connection terminal 90, having the elastic force at the curved surface 92, makes a close contact with the knuckle 210 and the hooking part 220. The guide groove 214 formed at the circumference of the knuckle 210 guides the movement of the third connection terminal 95, when opening the flip cover 200.

Figure 14:
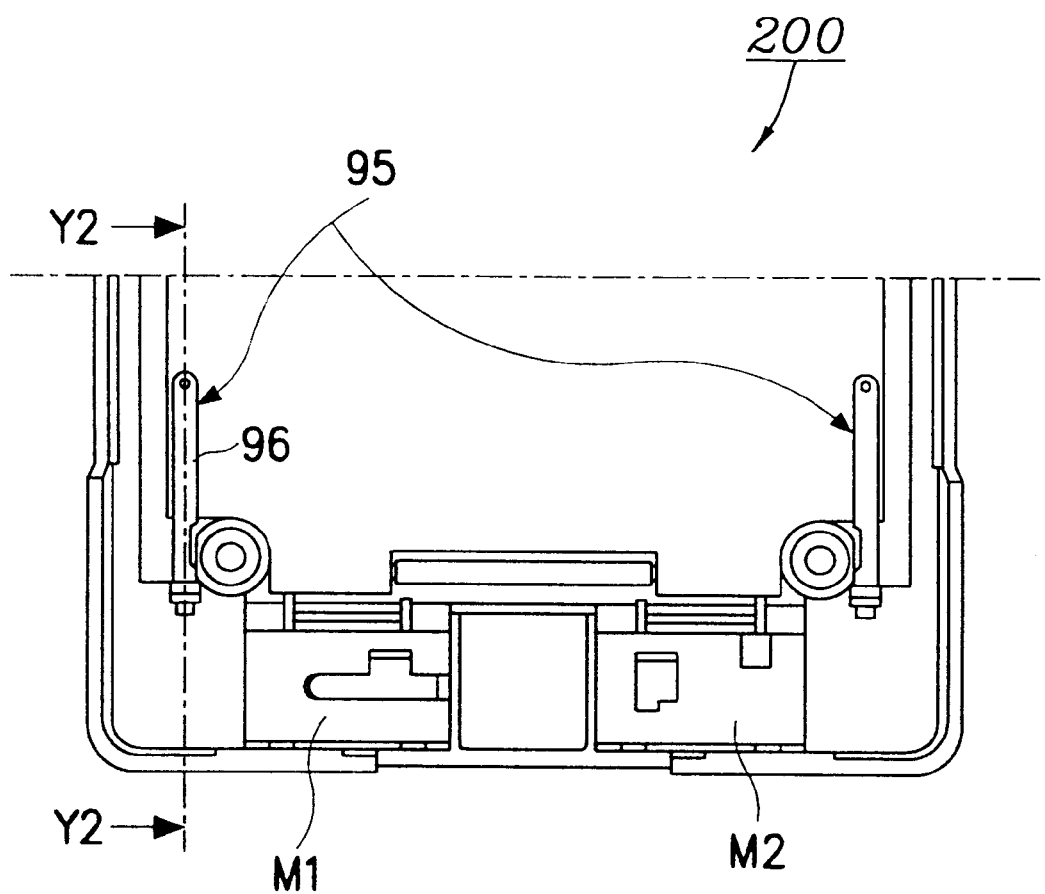
FIG. 14 is a plan view illustrating a state where the connection terminal is assembled into the telephone body according to the second embodiment of the present invention.
Figure 15:
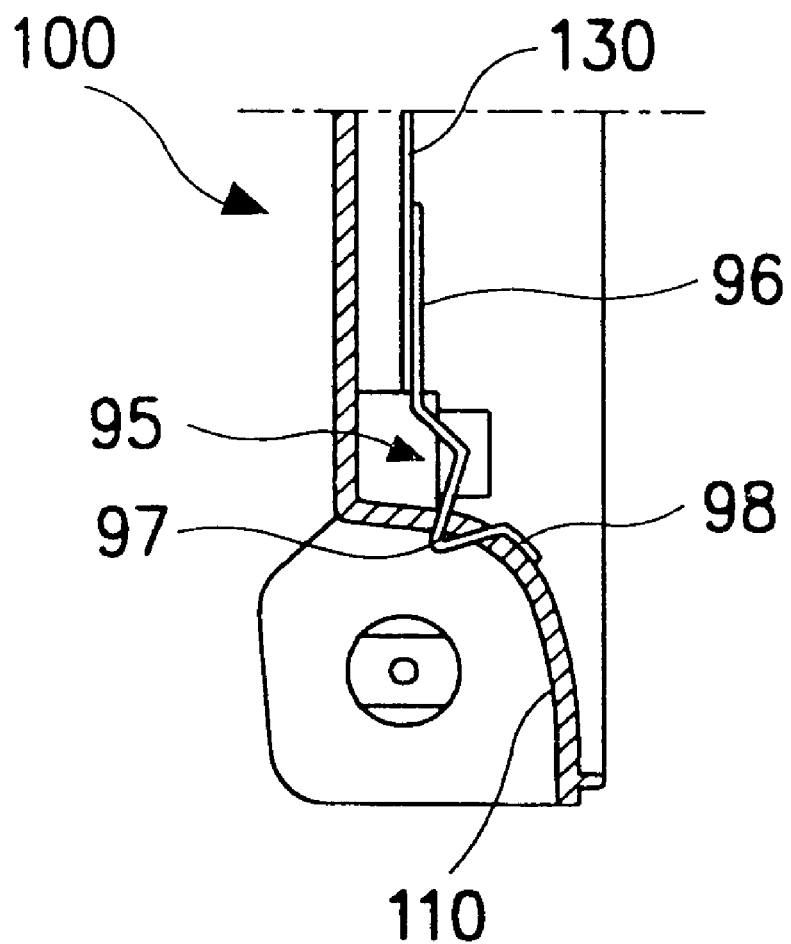
FIG. 15 is a cross-sectional view, taken along line Y2—Y2 of FIG. 14.

FIG. 14 is a plan view illustrating a state where the third connection terminal 95 is installed in the telephone body 100 according to the second embodiment of the present invention, and FIG. 15 is a cross-sectional view taken along line Y2—Y2 of FIG. 14. As illustrated in FIGS. 14 and 15, the first and second hinge modules M1 and M2 are installed at both sides of the receiving part 105 positioned at the bottom of the telephone body 100, and the third connection terminal 95 is made by bending a conductive elastic material in the shape of a bar. The third connection terminal 95 has a plane surface 96, a contact surface 97, and a hooking surface 98. The plane surface 96 of the third connection terminal 95 is fixed to the main printed circuit board 130 of the telephone body 100, thereby to attach the flip cover 200 to the telephone body 100 and connect the microphone 80 to the audio circuit. The contact surface 97 of which the peak juts into a rotation surface 100 of the telephone body 100, contacts the second connection terminal 90, when opening the flip cover 200. The hooking surface 98 restrains the movement of the contact surface 97 to prevent an excessive jutting out of the contact surface 97. The third connection terminal 95 also has the elastic force.

Figure 16:
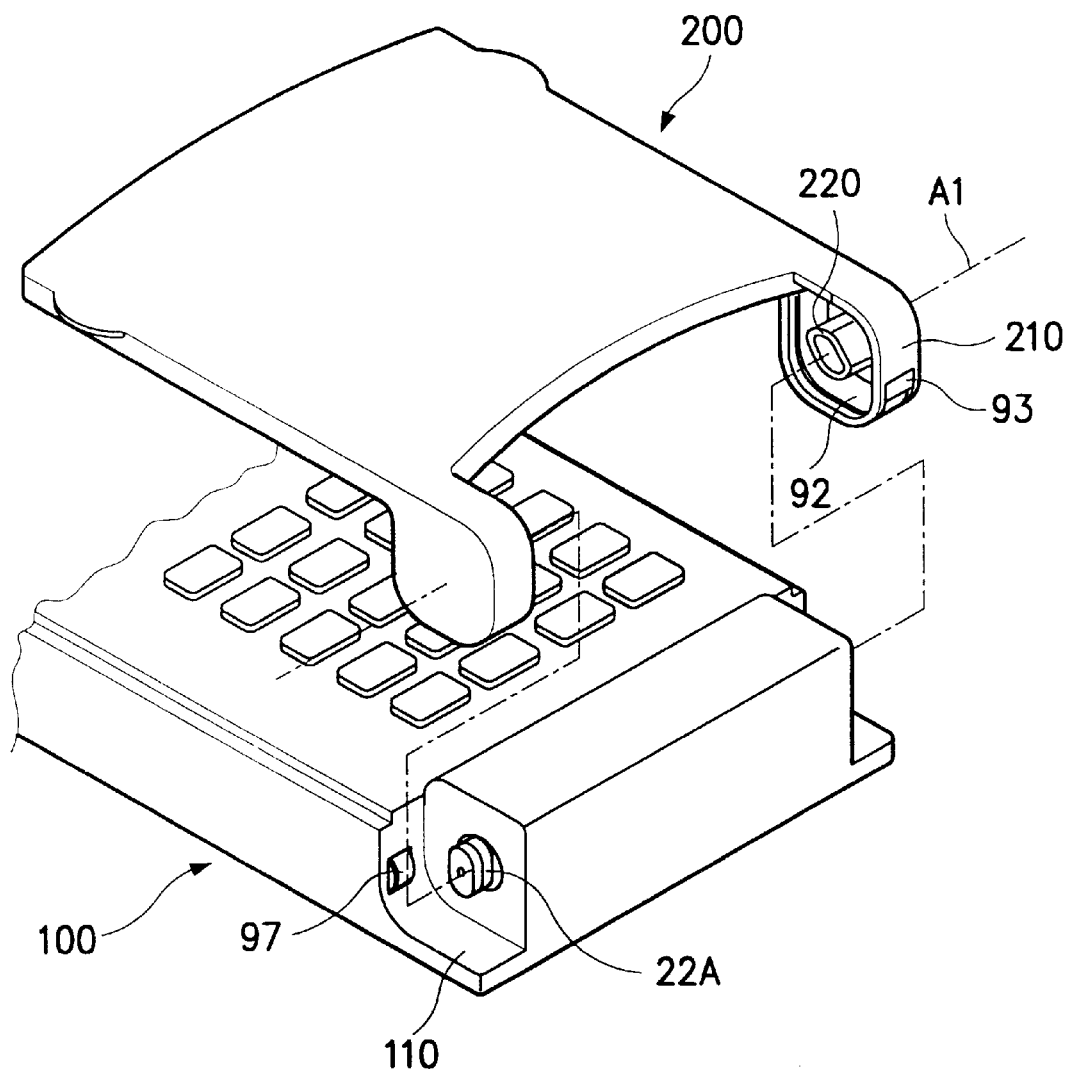
FIG. 16 is a perspective view illustrating how to assemble the flip cover into the telephone body according to the second embodiment of the present invention.
Figure 17A:
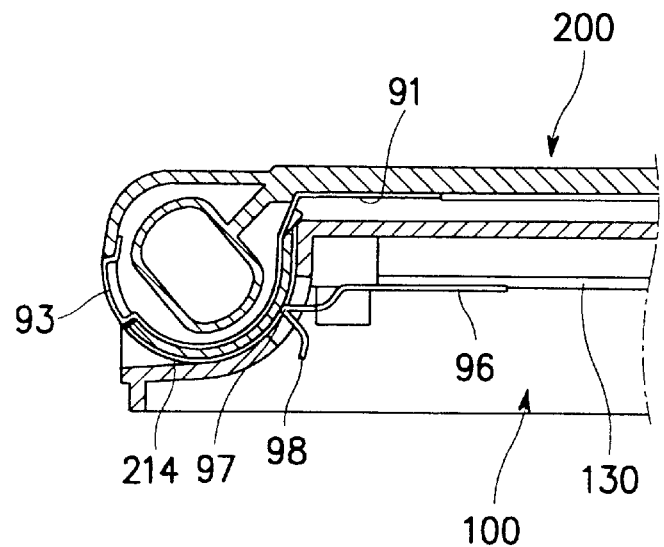
FIG. 17A is a cross-sectional view illustrating the microphone connecting device in case the flip cover is closed to the telephone body, according to the second embodiment of the present invention.

FIG. 16 is a perspective view illustrating how to assemble the flip cover 200 into the telephone body 100 according to the second embodiment of the present invention. FIG. 17A is a cross-sectional view illustrating the microphone connecting device in which the flip cover 200 is closed, and FIG. 17B is a cross-sectional view illustrating the microphone connecting device in which the flip cover 200 is opened from the telephone body 100.

Figure 17B:
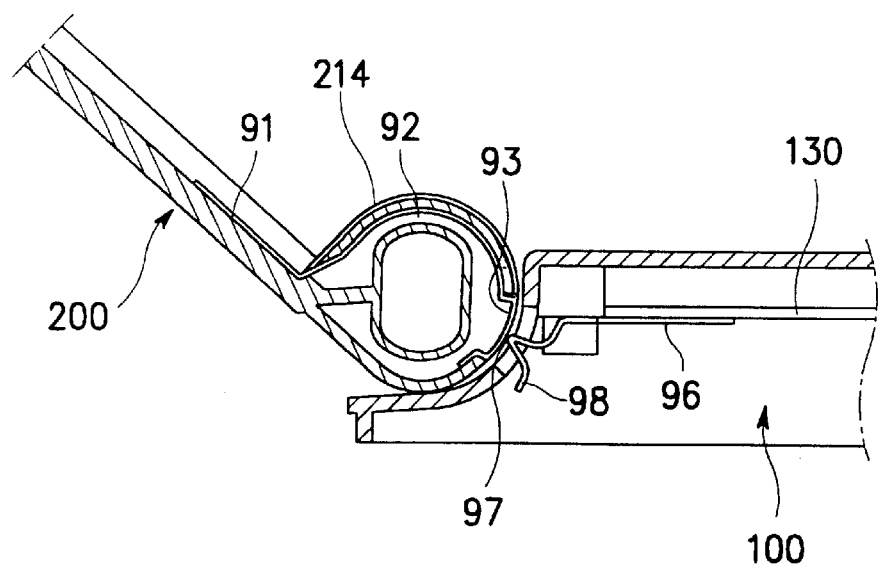
FIG. 17B is a cross-sectional view illustrating the microphone connecting device in case the flip cover is open from the telephone body, according to the second embodiment of the present invention.

Referring to FIGS. 16, 17A, and 17B, the end portion 22a of the hinge shaft 2 is forcedly inserted into the hooking part 220 of the flip cover 200. As illustrated in FIG. 17A, when the flip cover 200 is in the close standby position at the angle of about zero degree, the sliding surface 93 of the second connection terminal 90 is separated from the contact surface 97 of the third connection terminal 95. However, as illustrated in FIG. 7B, when the flip cover 200 is in the open communication position at about 135 degrees, the sliding surface 93 moves along the rotation surface 110, making a surface contact with it, and at the same time, the contact surface 97 moves along the guide groove 214, making a surface contact with it. Consequently, the second connection terminal 90 contacts with the third connection terminal 95, thereby connecting the microphone 80 to the printed circuit board of the telephone body 100. The contact between the second and third connection terminals 90 and 95 is constantly maintained by means of the elastic force.

Accordingly, when the flip cover 200 is opened, the microphone 80 is connected to the second connection terminal 90 via the electric wire 81. The sliding surface 93 of the second connection terminal contacts with the contact surface 97 of the third connection terminal 95. The contact surface 97 is connected to the audio circuit in the printed circuit board via the planar surface 96. Since the sliding surface 93 and the contact surface 97 both have elastic characteristics, the contact therebetween can be maintained. Further, even in case of an external impact, the contact can be maintained.

If the flip cover 200 is closed, the sliding surface 93 is separated from the contact surface 97, disconnecting the microphone 80 from the audio circuit of the telephone body 100.

Advantageously, when a strong impact or an excessive force is applied to the flip cover 200, the flip cover 200 is detached Then, the user can readily reassemble the flip cover 200 into the telephone body 100.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A flip-type telephone having a flip cover and a telephone body, comprising:
    a hinge apparatus comprising:
        means for coupling said flip cover to said telephone body and for facilitating opening and closing of said flip cover relative to said telephone body;
        a hinge housing;
        a hinge shaft having a protrusion at an end and a shaft at another end, being assembled into said hinge housing;
        conductive means disposed in a through hole formed along an axis of said hinge shaft;
        a cam hinge for engaging with the hinge shaft, and a through hole formed along the axis of the hinge shaft;
        a hinge cover for covering an end of said hinge housing, said hinge cover having a through hole formed along the axis of the hinge shaft, through which an electric wire passes; and
        a coil spring interposed between said cam hinge and said hinge cover for biasing said cam hinge; and
    said flip cover including:
        a connection terminal having first and second end portions, said second end portion having tension means for maintaining electrical conductive contact with said conductive means of said hinge apparatus during said opening and closing of said flip cover; and
        a microphone mounted on the flip cover, being electrically connected to said connection terminal, and an audio circuit in the telephone body.

2. The flip-type telephone as claimed in claim 1, wherein said conductive means comprises:
    a cylinder;
    a conductive bar assembled into the cylinder, being movable in a lengthwise direction; and
    an elastic body installed in the cylinder, for biasing said conductive bar, wherein an end of said conductive bar is projected out of said hinge shaft.

3. The microphone connecting device as claimed in claim 2, wherein said elastic body is a coil spring.

4. The flip-type telephone as claimed in claim 2, wherein said conductive bar comprises:
    a small diameter part with an end being projected out of the cylinder; and
    a large diameter part installed in the cylinder.

5. The flip-type telephone as claimed in claim 1, wherein said tension means includes opposing surfaces bent in a transverse direction and having elastic characteristics.

6. The flip-type telephone as claimed in claim 1, wherein said cam hinge includes opposing protrusions and opposing indents for facilitating movement of said flip cover relative to said telephone body to a fixed position.

7. The flip-type telephone as claimed in claim 1, wherein a diameter of said cylinder is smaller than a diameter of the through hole formed in the cam hinge.

* * * * *